(12) United States Patent
Wobben

(10) Patent No.: US 7,102,249 B2
(45) Date of Patent: Sep. 5, 2006

(54) GENERATOR FOR USE IN HYDROELECTRIC POWER STATION AND METHOD OF USING SAME

(76) Inventor: Aloys Wobben, Argestrasse 19 D-26607, Aurich (DE)

( * ) Notice: Subject to any disclaimer, the term of this patent is extended or adjusted under 35 U.S.C. 154(b) by 82 days.

(21) Appl. No.: 10/492,386

(22) PCT Filed: Sep. 27, 2002

(86) PCT No.: PCT/EP02/10840

§ 371 (c)(1),
(2), (4) Date: Sep. 13, 2004

(87) PCT Pub. No.: WO03/036080

PCT Pub. Date: May 1, 2003

(65) Prior Publication Data

US 2005/0023837 A1 Feb. 3, 2005

(30) Foreign Application Priority Data

Oct. 19, 2001 (DE) .................................. 101 52 712

(51) Int. Cl.
*F03B 13/00* (2006.01)
(52) U.S. Cl. .................. 290/54; 290/40 C; 290/43; 290/55; 310/114; 310/118; 310/119; 60/398; 60/671
(58) Field of Classification Search ............... 290/54, 290/40, 43, 55; 310/114, 118, 119; 60/398, 60/671
See application file for complete search history.

(56) References Cited

U.S. PATENT DOCUMENTS 4,616,298 A * 10/1986 Bolson ................. 362/192
4,720,640 A * 1/1988 Anderson et al. ........... 290/43
5,506,453 A * 4/1996 McCombs .................. 290/44
5,798,572 A * 8/1998 Lehoczky ................... 290/54
6,104,097 A * 8/2000 Lehoczky ................... 290/54
6,417,578 B1 * 7/2002 Chapman et al. ........... 290/44
6,448,668 B1 * 9/2002 Robitaille ................... 290/54
6,483,199 B1 * 11/2002 Umemoto et al. ........... 290/55
6,559,554 B1 * 5/2003 Finley et al. ............... 290/54
6,641,327 B1 * 11/2003 Lassila et al. ............... 405/78
6,806,586 B1 * 10/2004 Wobben ..................... 290/54

FOREIGN PATENT DOCUMENTS

| EP | 0 222 352 | 5/1987 |
| FR | 990 189 | 9/1951 |
| FR | 1 078 450 | 11/1954 |
| FR | 1 082 831 | 1/1955 |
| WO | WO 01/14739 | 3/2001 |

* cited by examiner

Primary Examiner—Darren Schuberg
Assistant Examiner—Iraj A. Mohandesi
(74) Attorney, Agent, or Firm—Neil A. Steinberg; Mark Steinberg

(57) ABSTRACT

One aspect of the present invention concerns a generator for a hydroelectric power station, having a stator and a rotatably mounted rotor, and first vanes which act on the rotor and which cause rotation of the rotor. In order for the generator to be of a smaller structural size the stator is mounted rotatably and there are provided second vanes which act on the stator and which cause rotation of the stator in a direction opposite to the rotation of the rotor.

20 Claims, 2 Drawing Sheets

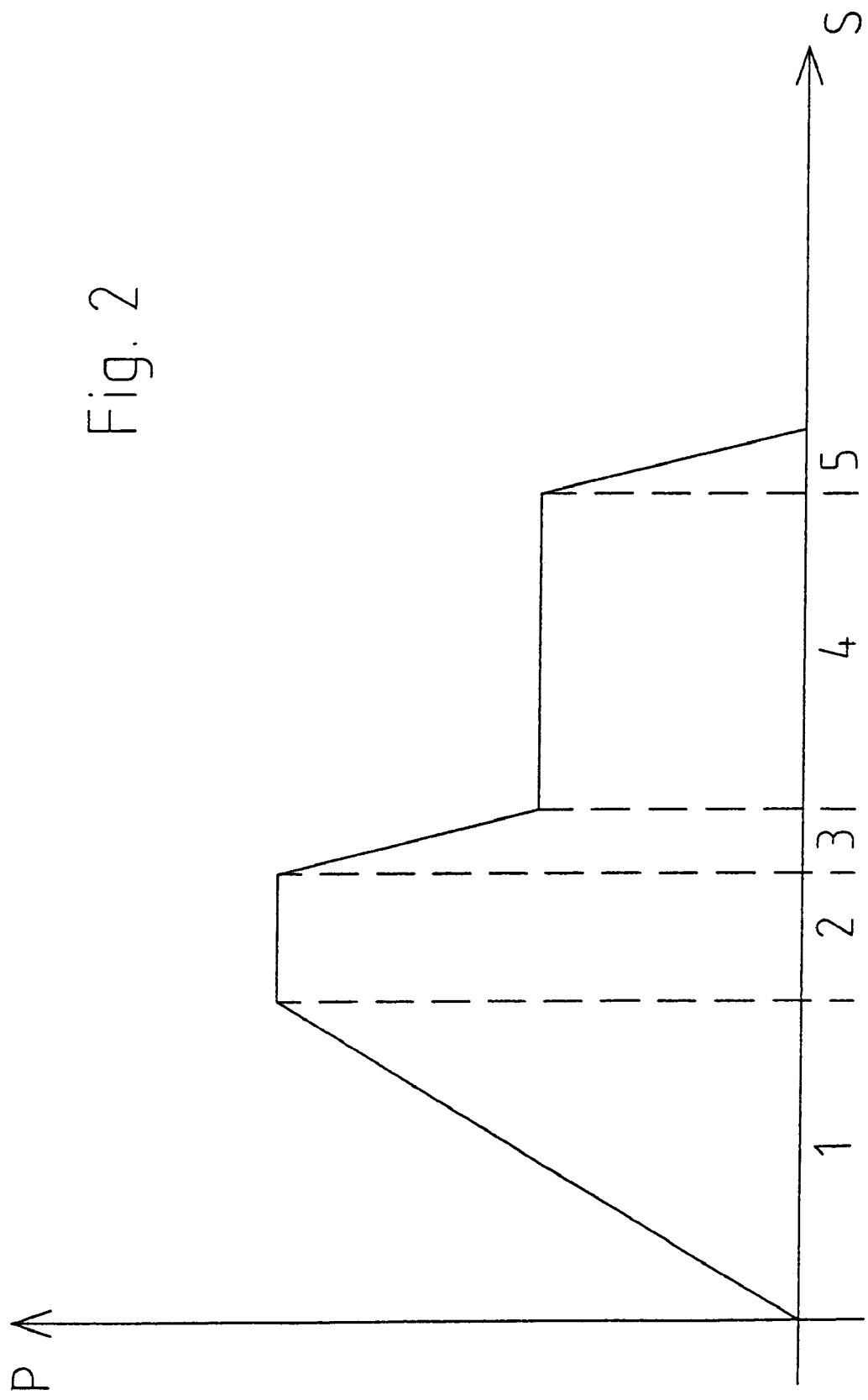

GENERATOR FOR USE IN HYDROELECTRIC POWER STATION AND METHOD OF USING SAME

RELATED INFORMATION

Figure 1:
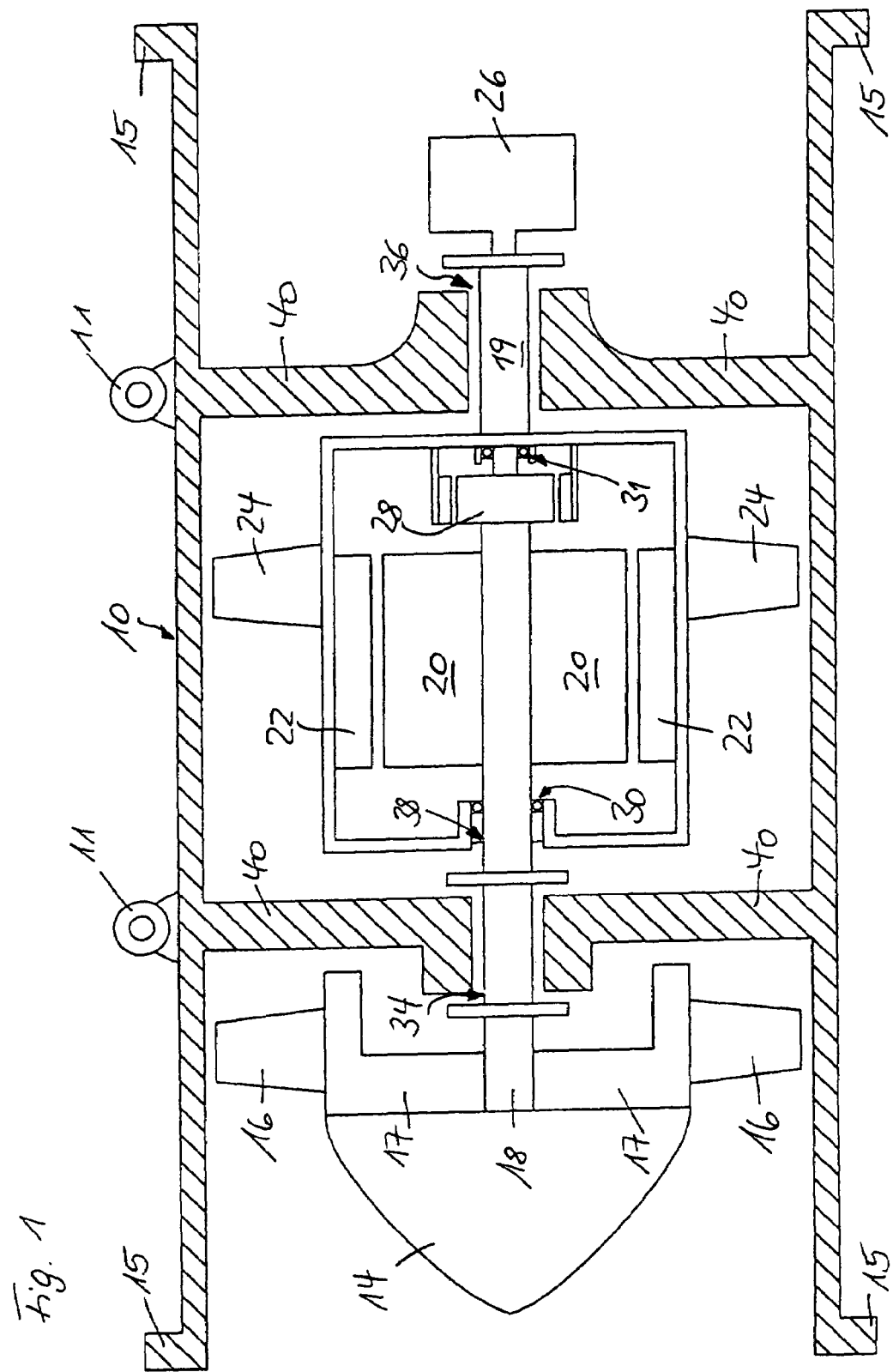

The present invention concerns a generator having a stator and a rotatably mounted rotor, and first vanes which act on the rotor and which cause rotation of the rotor, and a hydroelectric power station having such a generator.

A generator for a hydroelectric power station is known from the state of the art, for example from CH 31 69 00, FR 1 082 831, DE-A1 199 07 180 and U.S. Pat. No. 4,289,971.

That kind of generators is generally known and is used for example in falling water power stations on reservoirs. It will be appreciated that, in all generators, there is an interaction between structural size and rotary speed. The higher the rotary speed of the rotor (for example a Pelton turbine), the correspondingly smaller can the generator be, with the same output—or expressed the other way round: the slower the rotor rotates (for example a Francis turbine), the correspondingly greater is the structure of the generator.

It will be appreciated that there is the possibility of providing a transmission between the first vanes which cause rotation of the rotor and the rotor of the generator, the transmission producing a high rotary speed for the rotor. As a result the generator itself could turn out to be relatively small. It will be noted however that the transmission reduces the level of efficiency of the installation, forms a potential source of trouble and naturally must be driven at a sufficiently high torque which in turn requires correspondingly large items of equipment such as rotor blades or guide vanes.

The object of one aspect of the present invention is to provide a generator which avoids the disadvantages involved in the use of a transmission but which nonetheless is of a small structure.

In accordance with one aspect of the invention, in a generator of the kind set forth in the opening part of this specification, that object is attained in that the stator is mounted rotatably and that there are provided second vanes which act on the stator and which cause rotation of the stator in a direction opposite to the rotation of the rotor.

In that respect one aspect of the present invention is based on the realization that the criterion for the structural size of the generator is the relative speed between the rotor and the stator of the generator. When the generator has a stationary stator, that relative speed arises solely out of the rotational speed of the rotor. If however the stator is mounted rotatably and rotates in a direction in opposite relationship to the direction of rotation of the rotation of the rotor, the two speeds are added together so that the sum of both speeds of rotation becomes effective. Accordingly the size of the generator can be halved, with the same output.

In order to embody a simple structure for the generator, a preferred embodiment of one aspect of the invention provides that the first and/or second vanes act by way of a shaft on the rotor and on the stator respectively.

So that operation in a fluid medium such as water is possible, the generator must be safely protected from moisture in a housing. In order to provide for a simple design configuration for the housing, it is of a multi-part nature and the stator is mounted in a water-tightly sealed part of the housing, which in turn is mounted rotatably and on the outside of which the second vanes are arranged. In that way the second vanes can produce rotation of the housing with the stator installed therein.

A rotor shaft can in turn be mounted rotatably in that housing, the rotor shaft on the one hand carrying the rotor and on the other hand, at a portion disposed outside the housing, carrying a further housing portion on which the first vanes are mounted in order to cause rotation of the shaft and thus the rotor of the generator.

In a particularly preferred development of one aspect of the invention the spacing of the vanes relative to each other is such that the aqua fauna is put at risk to the minimum possible extent. That involves on the one hand the respective spacing of the first and second vanes from each other in the peripheral direction and on the other hand the spacing between the first and second vanes in order to ensure that for example fish are not simultaneously exposed to the first and second vanes.

BREIF DESCRIPTION OF DRAWINGS

Aspects of the invention are described in greater detail hereinafter with reference to the accompanying Figures in which:

FIG. 1 is a simplified cross-sectional view of a generator according to one embodiment of aspects of the invention, and FIG. 2 shows the pressure pattern in the water when flowing through the generator.

DETAILED DESCRIPTION

FIG. 1 shows a generator arranged in a flow passage 10. In this case the direction of flow of the water is from left to right in the Figure. The generator is supported by supports 40 which in the Figure are a component part of the flow passage 10. It will be appreciated that those supports 40 can equally be subsequently fitted in an existing flow passage 10, together with the generator.

In this case, the flow passage 10 is of a tubular configuration and at its ends has flanges 15, with which a connection can be made to passage portions (not shown) which are already present. That design configuration permits mounting or repair of the generator in the flow passage 10 when released from the other passage portions. As carrier eyes 11 are provided on the flow passage 10, replacement or release of the flow passage 10 from the other passage portions can be correspondingly easily implemented.

The generator illustrated in the flow passage 10 has essentially two housing portions, a front portion 14 and a rear portion 12. In this case the front housing portion 14 is of a streamlined configuration and avoids a dynamic build-up of the flowing water upstream of the generator.

The rear housing portion 12 accommodates the generator with the rotor and the stator 22 and further contains an exciter machine 28 for transmitting the exciter power to the rotor 22 of the generator.

As a relative movement is required between the rotor 20 and the stator 22, the rotor 20 is held and mounted rotatably with a rotor shaft 18 in the rear housing portion 12. In this case by way of example that mounting effect is afforded by way of rotary connections 30 and 31 as front and rear rotor mountings. In order to seal off the rear housing portion 12 in relation to the water, the arrangement has a seal 38 which is shown in simplified form in the Figure as an individual sealing lip but which can also be in the form of any other suitable seal.

The generator is arranged in the supports 40 with a front water-lubricated bearing 34 and a rear water-lubricated bearing 36. Those water-cooled bearings 34, 36 are reliably lubricated by a permanent supply of the lubricant—namely water—during operation. In addition, the water flowing through the arrangement is not endangered by other lubricants such as greases or the like.

That mounting arrangement permits rotation of the rotor 20 and the stator 22 of the generator in opposite directions. In order to supply the exciter power and to carry away the electrical power generated, the shaft 19 which is mounted in the rear, water-lubricated bearing 36 must be in the form of a hollow shaft in order to permit cables to be passed therethrough from a slip ring member 26 into the interior of the rear housing portion 12. The cable run is not shown in order to avoid unnecessarily restricting clarity of the Figure.

The mode of operation of this generator is described hereinafter. The water flowing through the flow passage 10 firstly impinges on the first vanes 16. Those first vanes 16 are connected to the rotor shaft 18 by way of a hub 17 at such an angle of incidence that it is caused to rotate, for example in the clockwise direction. In that respect the hub 17 and the vanes 16 are of such dimensions that they receive approximately half the kinetic energy of the water and convert it into rotary movement.

After the water has flowed further on in the flow passage 10, it reaches the rear housing portion 12 with the second vanes 24. In that case the angle of incidence of those vanes 24 is so selected and the vanes 24 are so dimensioned that the afflux flow of water also causes rotational movement of the rear housing portion 12 with the stator 22 of the generator, which is fixed therein. In the present example, it will be assumed that the direction of rotation is counter-clockwise. In that situation the vanes 24 again take approximately half the kinetic energy from the water and convert it into rotational energy.

As the rear housing portion 12 with the stator rotates with respect to the flow passage 10 and the front housing portion 14 with the rotor 20 in turn rotates with respect to the rear housing portion 12, the exciter power is fed by way of the slip ring member 26 through the shaft 19 in the form of a hollow shaft and an exciter machine 28 to the rotor 20 of the generator and the electrical power induced in the stator 22 of the generator is in turn taken away from the generator through the hollow shaft 19 and the slip ring member 26.

FIG. 2 shows the pressure pattern in the water in the flow passage 10. As the first vanes 16 and the second vanes 24 are so designed that they each take approximately half the kinetic energy from the water and as the first vanes 16 and the second vanes 24 rotate at a relatively low speed, the effects of the generator according to the invention on fish in the flow passage 10 are not as serious as the effects of comparable, conventional generators.

That is due in particular to the fact that conventional generators involve only one set of blades which in the best case take all the kinetic energy from the water and convert it into rotational energy. Accordingly, the maximum possible pressure drop occurs when flowing through that stage. In the case of the generator according to the invention, the pressure drop is distributed to two stages each involving approximately half the amount and accordingly less serious effects on the aqua fauna.

By virtue of the configuration and arrangement of the blades, it is possible to eliminate the installation of guide blades which are required in conventional generators in order to cause rotational movement of the water flowing into the generator or to cancel out again the rotational movement caused by a conventional generator. That function is performed here by the oppositely rotating first vanes 16 and second vanes 24. Therefore, the inflowing water is displaced in a clockwise rotational movement by the first vanes 16 corresponding to the direction of rotation of the first vanes 16. As however the second vanes 24 perform a counter-clockwise rotational movement, that clockwise rotational movement is thereby compensated again so that the discharge flow of water issues from the flow passage 10 in a substantially pressure-less condition and in a straight line.

The invention is claimed is:

1. A generator for a hydroelectric power station, the generator comprising:
   a rotatably mounted stator;
   rotatably mounted rotor;
   first vanes that act on the rotor and cause rotation of the rotor in a first direction;
   second vanes that act on the stator and cause rotation of the stator in a direction opposite to the rotation of the rotor;
   a housing on which the first vanes and the second vanes are arranged, wherein the housing includes (i) a water-tight portion and (ii) a multi-part configuration that includes a first housing part and a second housing part, the first vanes being arranged at the first housing part, the second vanes being arranged at the second housing part;
   a shaft on the rotor or the stator; and
   a water-lubricated bearing that accommodates the shaft.

2. The generator of claim 1 wherein the shaft is on the rotor.

3. The generator of claim 2 wherein the first vanes act on the rotor by way of the shaft.

4. The generator of claim 2 further comprising a shaft on the stator.

5. The generator of claim 1 wherein the shaft is on the stator.

6. The generator of claim 5 wherein the second vanes act on the stator by way of the shaft.

7. The generator of claim 1 wherein (1) the shaft is on the rotor or stator and (2) the second vanes act on the stator by way of the shaft, and wherein the rotor and the stator are disposed in the water-tight portion of the housing.

8. The generator of claim 1 wherein the stator is disposed in the water-tight portion of the housing.

9. The generator of claim 1 wherein the rotor and the stator are disposed in the water-tight portion.

10. The generator of claim 1 wherein spacing between the first vanes and the second vanes is such that the aqua fauna is put at risk to the least possible extent.

11. A hydroelectric power station comprising:
   at least one generator including:
      a rotatably mounted stator;
      a rotatably mounted rotor;
      first vanes that act on the rotor and cause rotation of the rotor in a first direction;
      second vanes that act on the stator and cause rotation of the stator in a direction opposite to the rotation of the rotor;
      a shaft on the rotor or the stator; and
      a water-lubricated bearing that accommodates the shaft;
   wherein the at least one generator comprises a first generator, and wherein the hydroelectric power station further comprising a flow passage in which the first generator is installed.

12. The hydroelectric power station of claim 11 wherein the flow passage has an outlet opening and flanges at a periphery of the outlet opening for connection to other passage portions.

13. The hydroelectric power station of claim 11 wherein the flow passage has an intake opening and flanges at a periphery of the intake opening for connection to other passage portions.

14. The hydroelectric power station of claim 13 wherein the flow passage has an outlet opening and flanges at a periphery of the outlet opening for connection to other passage portions.

15. The hydroelectric power station of claim 11 wherein the flow passage has an outlet opening and flanges at a periphery of the outlet opening for connection to other passage portions.

16. The hydroelectric power station of claim 11 further comprising engagement points for hoisting devices, the engagement points being provided at predetermined positions on the flow passage.

17. The hydroelectric power station of claim 11 wherein the generator has a housing having a water-tight portion, the rotor and the stator being disposed in the water-tight portion.

18. A method for use in generating power in a hydroelectric power station, the method comprising:
   rotatably mounting a stator;
   rotatably mounting a rotor;
   acting on the rotor by the first vanes to cause rotation of the rotor in a first direction;
   acting on the stator by the second vanes to cause rotation of the stator in a direction opposite to the rotation of the rotor;
   providing a shaft on the rotor or the stator; and
   rotatably supporting the shaft with a water lubricated bearing, and providing a housing having a water-tight portion, wherein the rotor and stator are disposed in the water-tight portion.

19. A generator for a hydroelectric power station, the generator comprising:
   a rotatably mounted stator;
   a rotatably mounted rotor,
   first vanes that act on the rotor and cause rotation of the rotor in a first direction,
   second vanes that act on the stator and cause rotation of the stator in a direction opposite to the rotation of the rotor; and
   a housing having a water-tight portion;
   wherein the rotor and the stator are disposed in the water-tight portion.

20. A hydroelectric power station comprising at least one generator as set forth in claim 19.

* * * * *

UNITED STATES PATENT AND TRADEMARK OFFICE
CERTIFICATE OF CORRECTION

| | | |
|---|---|---|
| PATENT NO. | : 7,102,249 B2 | Page 1 of 1 |
| APPLICATION NO. | : 10/492386 | |
| DATED | : September 5, 2006 | |
| INVENTOR(S) | : Wobben | |

It is certified that error appears in the above-identified patent and that said Letters Patent is hereby corrected as shown below:

In col. 4, on line 8, delete "is" after "invention".

Signed and Sealed this

Fourth Day of September, 2007

JON W. DUDAS
*Director of the United States Patent and Trademark Office*